(12) United States Patent
Kinugasa et al.

(10) Patent No.: US 8,243,190 B2
(45) Date of Patent: Aug. 14, 2012

(54) SOLID STATE IMAGE PICKUP DEVICE AND CAMERA WITH FOCUS DETECTION USING LEVEL SHIFTING

(75) Inventors: Tomohisa Kinugasa, Zama (JP); Hidekazu Takahashi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 12/707,746

(22) Filed: Feb. 18, 2010

(65) Prior Publication Data

US 2010/0141818 A1  Jun. 10, 2010

Related U.S. Application Data

(62) Division of application No. 11/376,204, filed on Mar. 16, 2006, now Pat. No. 7,692,713.

(30) Foreign Application Priority Data

Apr. 21, 2005 (JP) ................... 2005-123527

(51) Int. Cl.
*H04N 5/232* (2006.01)
*G03B 13/36* (2006.01)

(52) U.S. Cl. ........................ 348/350; 396/128

(58) Field of Classification Search .............. 348/241, 348/243, 245, 345, 349, 350; 396/111, 114, 396/128
See application file for complete search history.

(56) References Cited

U.S. PATENT DOCUMENTS

| | | | | |
|---|---|---|---|---|
| 4,786,933 A | 11/1988 | Makino | | 354/402 |
| 4,902,886 A | 2/1990 | Smisko | | |
| 5,182,658 A | 1/1993 | Ishizaki et al. | | 358/483 |
| 5,617,093 A * | 4/1997 | Klein | | 341/150 |
| 5,659,816 A | 8/1997 | Uchiyama | | 396/124 |
| 5,900,927 A | 5/1999 | Hasegawa | | 356/3.13 |
| 5,917,960 A | 6/1999 | Sugawa | | 382/278 |
| 6,025,875 A | 2/2000 | Vu et al. | | 348/241 |
| 6,871,018 B2 | 3/2005 | Nakata | | 396/96 |
| 6,973,265 B2 | 12/2005 | Takahashi | | 396/121 |
| 7,164,447 B2 | 1/2007 | Takahashi | | 348/350 |
| 7,679,422 B1 * | 3/2010 | Thiagarajan et al. | | 341/155 |
| 7,692,713 B2 * | 4/2010 | Kinugasa et al. | | 348/350 |
| 2002/0003582 A1 | 1/2002 | Kadohara et al. | | 348/345 |

(Continued)

FOREIGN PATENT DOCUMENTS

JP  61-45685 A  3/1986

(Continued)

OTHER PUBLICATIONS

European Search Report dated Aug. 12, 2011 in Application No. 06110771.0.

*Primary Examiner* — Jason Whipkey (74) *Attorney, Agent, or Firm* — Fitzpatrick, Cella, Harper & Scinto (57) ABSTRACT

A solid-state image pickup device wherein, in order to obtain an output of large amplitude from a low-contrast object without using a bottom detecting circuit to thereby increase a capturing rate, an accumulation end is determined when a maximum value signal in a photosensor array reaches a predetermined accumulation end level, and an amplifier circuit unit is provided for amplifying a signal, which is outputted from each of the pixels of the photosensor array, with reference to the maximum value signal of the photosensor array and for outputting the signal.

3 Claims, 8 Drawing Sheets

U.S. PATENT DOCUMENTS

| | | |
|---|---|---|
| 2007/0070230 A1 | 3/2007 | Takahashi ..................... 348/308 |
| 2007/0115377 A1 | 5/2007 | Noda et al. ..................... 348/294 |

FOREIGN PATENT DOCUMENTS

| | | |
|---|---|---|
| JP | 4-251811 A | 9/1992 |
| JP | 7-298145 A | 11/1995 |
| JP | 8-251470 A | 9/1996 |
| JP | 9-274133 A | 10/1997 |
| JP | 2003-107340 A | 4/2003 |

* cited by examiner

SOLID STATE IMAGE PICKUP DEVICE AND CAMERA WITH FOCUS DETECTION USING LEVEL SHIFTING

CROSS REFERENCE TO RELATED APPLICATION

The present application is a division of U.S. application Ser. No. 11/376,204 filed on Mar. 16, 2006, the entire disclosure of which is incorporated by reference herein.

BACKGROUND OF THE INVENTION

1. Field of the Invention

The present invention relates to a solid state image pickup device, and more particularly to a solid state image pickup device for detecting focus (hereinafter, also referred to as AF) and a camera using the solid state image pickup device for detecting focus.

2. Related Background Art

An explanation will be made on a conventional solid state image pickup device used for a camera for detecting focus based on a phase difference detection system. According to the conventional solid state image pickup device, an object as a subject of focus detection is projected on a photosensor array on the solid state image pickup device to obtain an electrical signal output to which photoelectric conversion has been applied, in the form of an image. Photocarrier generated in the photosensor array is subjected to charge-voltage conversion to be stored in a capacitor for holding a signal. During accumulation processing, auto gain control (peak monitor control system) is generally adopted to monitor the maximum output value based on a contrast of the object that spreads over a wide area, to thereby control an accumulation time. The above is disclosed in Japanese Patent Application Laid-Open No. S61-045685.

After accumulation end, the obtained image signal is inputted to an analog to digital converter (ADC) to be subjected to arithmetic operation processing by a microcomputer. If a distance to the subject of focus detection is obtained through the arithmetic operation processing by the microcomputer, a motor is driven to control a lens for focusing. The image signal outputted from the solid image pickup device is subjected to signal processing so that an input dynamic range of from the ADC can be effectively used. The signal processing includes level shift processing and gain processing. According to the level shift processing, a specific signal voltage outputted from the photosensor array is adjusted to an arbitrary output reference voltage. According to the gain processing, a gain is applied to a level-shifted signal. In the level shift processing, it is common to adjust a signal voltage of an optical black (OB) pixel arranged in the photosensor array to an arbitrary output reference voltage. This is referred to as dark reference output system.

However, in a case where the peak monitor control and the dark reference output are used in combination to perform phase difference detecting as described above, it may not be possible to detect focus for a low-contrast object which produces a small output in amplitude. In view of this, a peak bottom reference output is used, in which a difference between a maximum output value and a minimum (bottom) output value is monitored to control an accumulation time while the minimum output value is compared with an output reference voltage to determine the level shift amount. Japanese Patent Application Laid-Open No. 2003-107340 discloses the above.

Figure 10A:
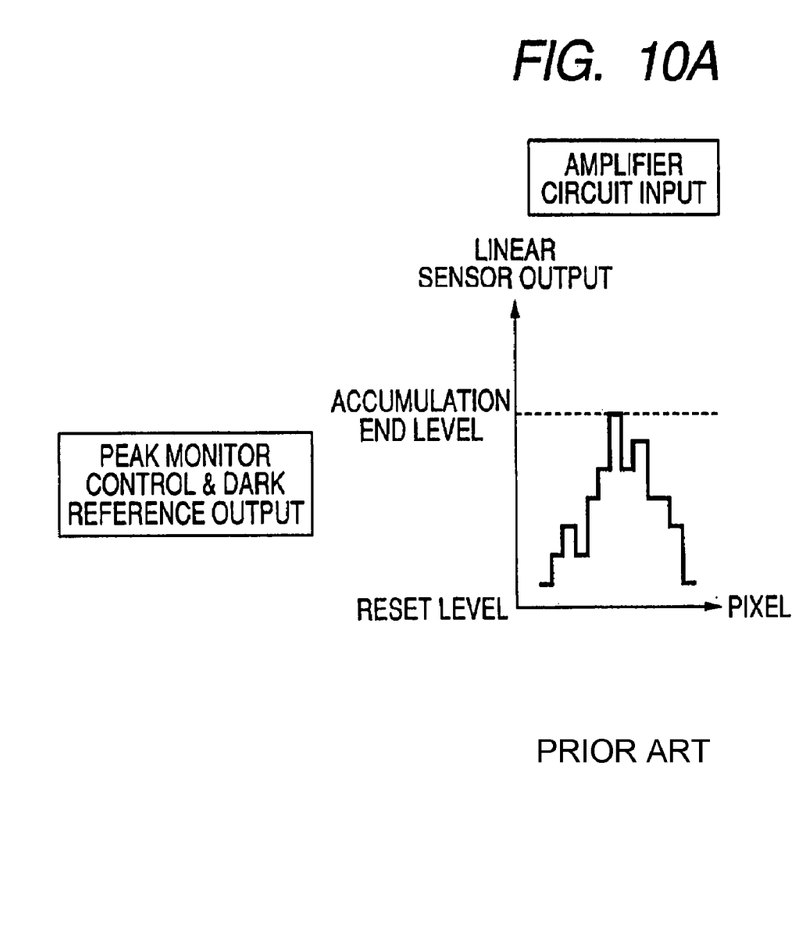
FIGS. 10A and 10B are graphs showing a conventional example.
Figure 10B:
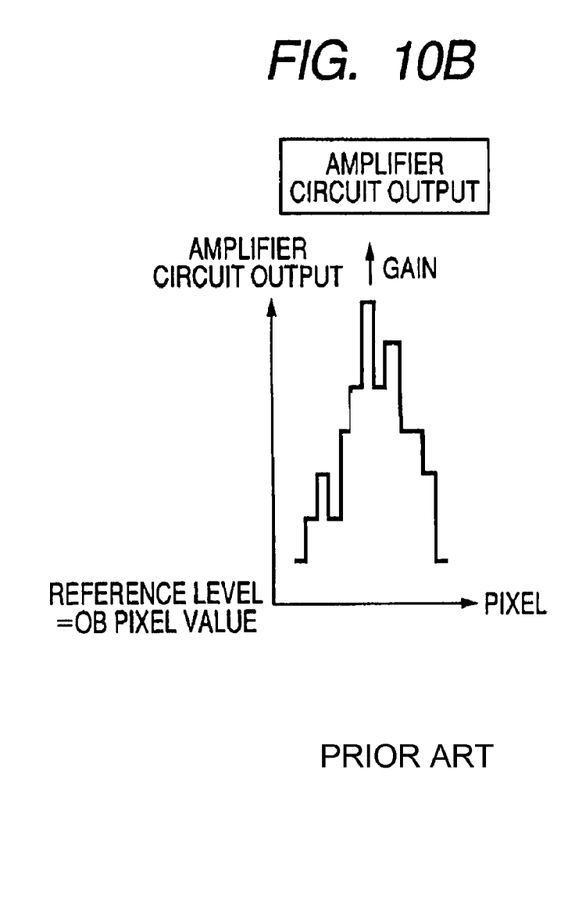
Figure 11A:
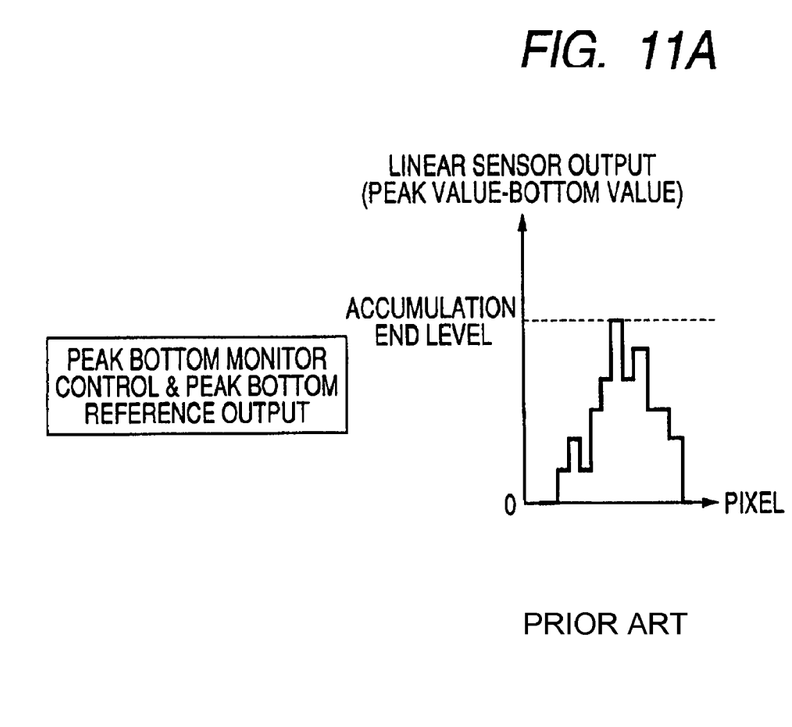
FIGS. 11A and 11B are graphs showing another conventional example.
Figure 11B:
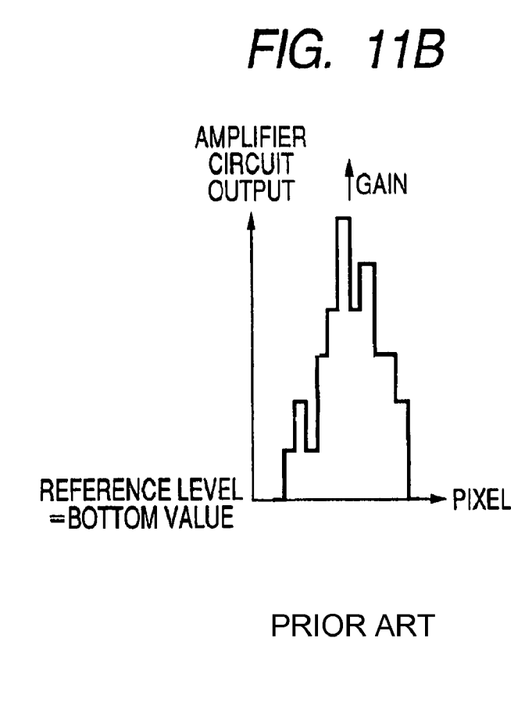

FIGS. 10A and 10B show conventional examples in which the peak monitor control and the dark reference output are combined, and FIGS. 11A and 11B show another conventional examples in which the peak bottom monitor control and the peak bottom reference output are combined. Each example shows an input signal (a) to an amplifier circuit, and output signal (b) obtained by subjecting the input signal (a) to the level shift processing and the gain processing. In the case where the peak monitor control and the dark-reference output are combined, accumulation ends when the maximum value outputted from the photosensor array reaches a full accumulation level. After the accumulation end, the signal voltage of the OB pixel is level-shifted to coincide with the output reference voltage, and applied with a gain. Also, in the case where the peak bottom monitor control and the peak bottom reference output are combined, accumulation ends when a voltage difference between the maximum output value and the minimum output value of the photosensor array reaches the full accumulation level. After the full accumulation, the minimum output value of the photosensor array is level-shifted to coincide with the output reference voltage, and applied with a gain.

However, according to the dark reference output described above, it may not be possible to detect focus for a low-contrast object which produces a small output in amplitude. According to the peak bottom reference output described above, a large output in amplitude can be obtained from a low-contrast object, but a bottom detecting circuit is necessary, which increases a chip area and power consumption.

SUMMARY OF THE INVENTION

The present invention has been made in view of the above-mentioned problems, and has an object to obtain a large output in amplitude even from a low-contrast object without using a bottom detecting circuit.

A solid state image pickup device according to an aspect of the present invention is characterized by including:

a photosensor array;

a control unit for determining accumulation end of photocarrier of the photosensor array when a maximum value signal among signals outputted from pixels of the photosensor array reaches a predetermined voltage; and an amplifier circuit unit for amplifying a signal, which is outputted from each of the pixels of the photosensor array, with reference to the maximum value signal and for outputting the amplified signal.

Figure 9A:
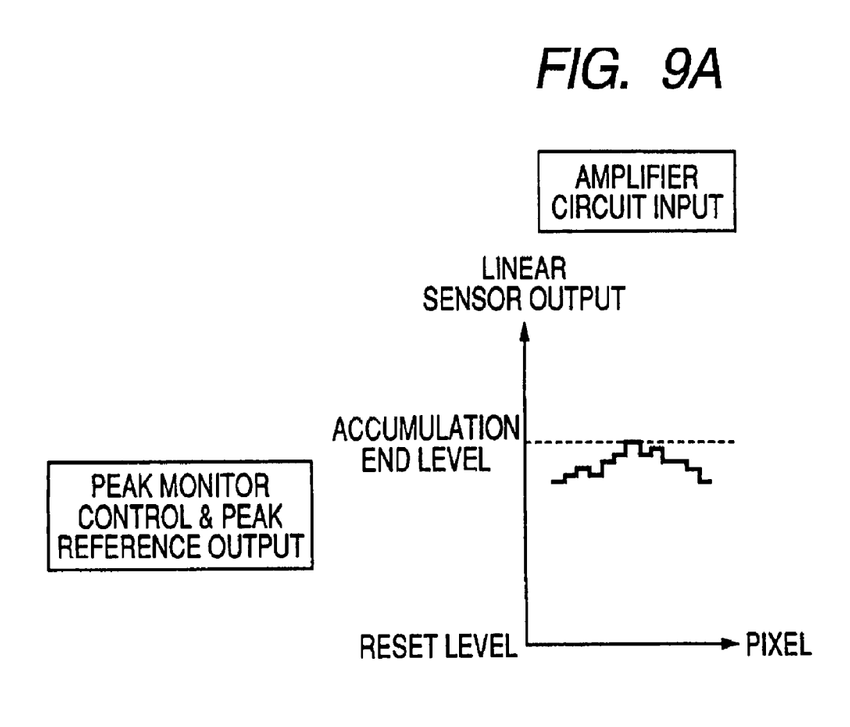
FIGS. 9A and 9B are graphs showing an effect of the present invention.
Figure 9B:
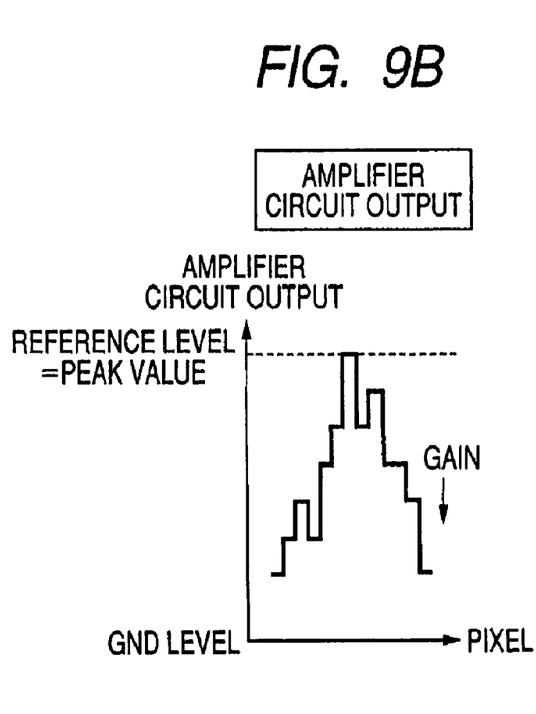

According to the present invention, specifically, a maximum value signal outputted from a photosensor array pair is level-shifted to coincide with an output reference voltage. In other words, the signal is level-shifted based on a peak reference output, and a gain is applied thereto to be outputted. FIGS. 9A and 9B show an effect of the present invention. An example shown in FIGS. 9A and 9B are cases where the peak monitor control and the peak reference output described above are combined for detecting focus of a low-contrast object. As shown in FIG. 9A, in a case of the low-contrast object, output small in amplitude is obtained from the photosensor arrays after accumulation end. However, as shown in FIG. 9B, applying a gain to the maximum value signal outputted from the photosensor array pair with reference to the output reference voltage can produce an output signal of large amplitude without exceeding a dynamic range of a gain amplifier.

According to the level shift means of the present invention, an output of large amplitude can be obtained from a low-

DESCRIPTION OF THE PREFERRED EMBODIMENTS

Hereinafter, embodiments according to the present invention are described with reference to the accompanying drawings.

First Embodiment

Figure 1:
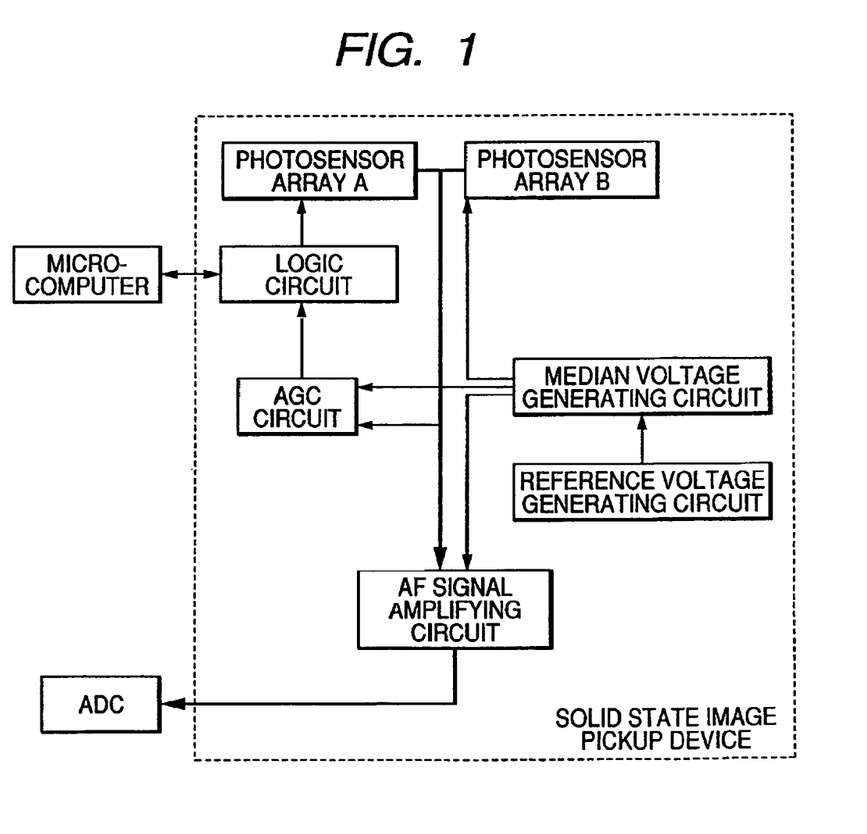
FIG. 1 is a block diagram showing a whole of a solid state image pickup device for detecting focus according to a first embodiment of the present invention and a periphery thereof.

An embodiment of the present invention is described with reference to FIG. 1. FIG. 1 is a block diagram showing a solid state image pickup device for detecting focus according to a first embodiment of the present invention and an external control block.

In FIG. 1, photosensor arrays are image pickup elements each for outputting an image signal of an object. The photosensor arrays are provided in a pair, and a distance between peak signals outputted from both of the photosensor arrays is obtained to detect focus. An AF signal amplifying circuit level-shifts an output from the photosensor array and applies a gain to the level-shifted output. A reference voltage generating circuit generates a band gap reference voltage. A median voltage generating circuit generates, based on the band gap reference voltage, median voltages such as an accumulation end voltage and an output reference voltage in the solid state image pickup device. An auto gain control (AGC) circuit monitors a maximum output from the photosensor array and outputs an accumulation end detection signal. A logic circuit controls a driving of the photosensor array. An external microcomputer controls the solid state image pickup device, and an output from the solid state image pickup device is inputted to an external ADC.

Figure 2:
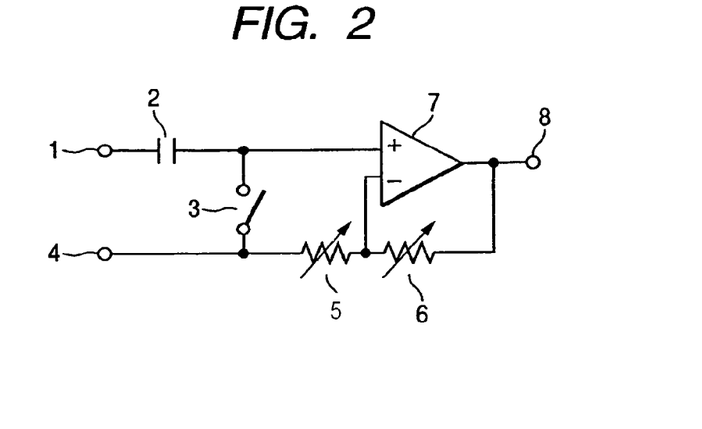
FIG. 2 is a circuit diagram showing a main part of the solid state image pickup device for detecting focus according to the first embodiment of the present invention.

FIG. 2 shows an example of a circuit diagram of the AF signal amplifying circuit of FIG. 1.

In FIG. 2, the AF signal amplifying circuit includes: an input terminal 1 to which the output from the photosensor array is inputted; a capacitor 2 for level shift; a switch 3 for level shift; an input terminal 4 at an output reference voltage; variable resistors 5 and 6 for determining an amount of gain; an operational amplifier 7; and an output terminal 8.

There are several methods to perform level shift, including using a CMOS source follower circuit. The level shift means according to the present invention has a simple structure composed of a capacitor and a switch. This simple structure can reduce an area for layout.

Figure 3:
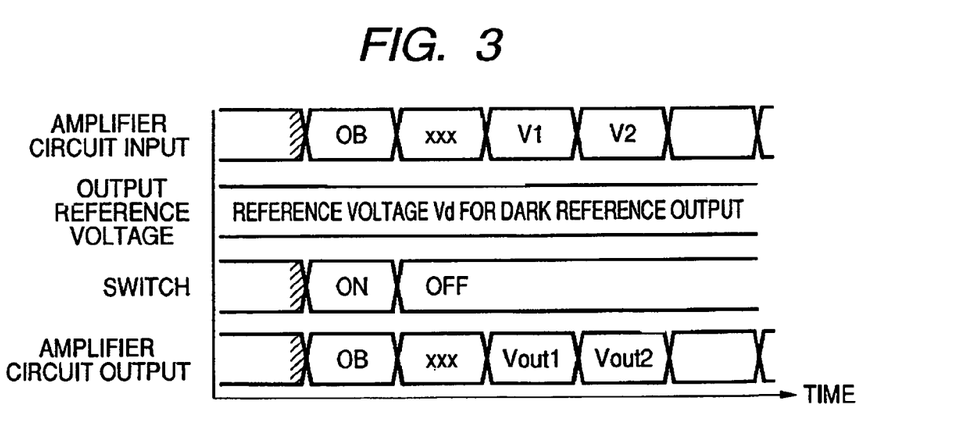
FIG. 3 is a chart showing timings for driving the solid state image pickup device for detecting focus according to the first embodiment of the present invention.
Figure 4:
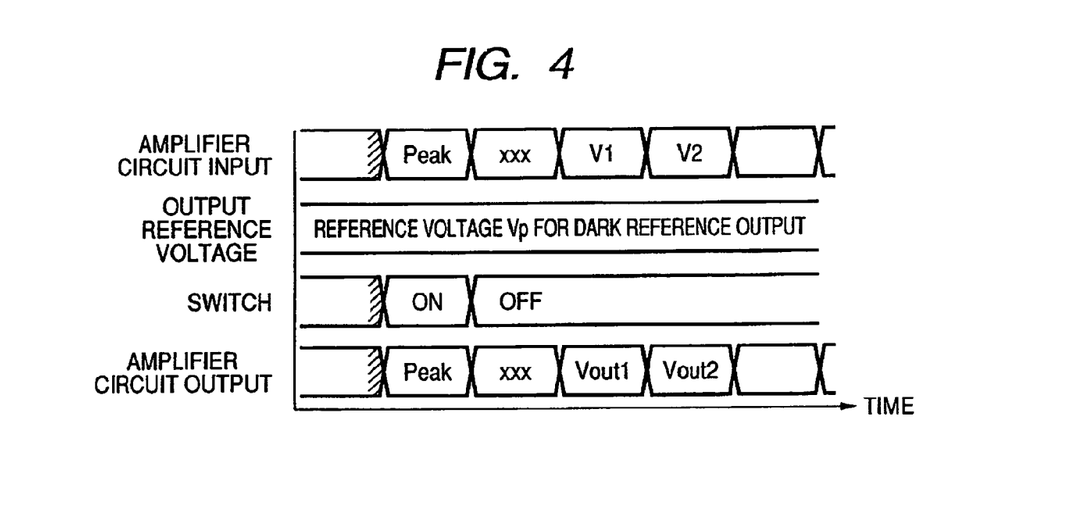
FIG. 4 is a chart showing timings for driving the solid state image pickup device for detecting focus according to the first embodiment of the present invention.

FIG. 3 shows a driving sequence based on the dark reference output in the AF signal amplifying circuit of FIG. 2, and FIG. 4 shows a driving sequence based on the peak reference output in the AF signal amplifying circuit of FIG. 2.

The level shift means follows the sequence described below. First, the sequence based on the dark reference output is described. In the dark reference output, a reference voltage is set to a dark reference output voltage Vd. The Vd is generally set to a voltage, close to a ground voltage (GND) to expand an output dynamic range. A switch is turned on at a timing when a voltage Vob of an OB pixel is inputted to the amplifier circuit input of FIG. 2. Next, the switch is turned off during the input of the voltage Vob of the OB pixel to the circuit. Accordingly, a voltage calculated as Vob−Vd is held in the capacitor 2. After that, an image signal Vn (n=1, 2, ... ) is inputted, so Voutn is expressed as: Voutn=Gain*(Vn−Vob)+Vd(n=1, 2, ... ).

Next, the sequence based on the peak reference output is described. In the peak reference output, a reference voltage is set to a peak reference output voltage Vp. The Vp is generally set to a voltage close to VDD to expand an output dynamic range. A switch is turned on at a timing when a voltage Vpeak of peak output is inputted to the amplifier circuit input of FIG. 2. Next, the switch is turned off before the image signal Vn (n=1, 2, ... ) is inputted to the circuit. Then, the switch is turned off during the input of the peak signal voltage Vpeak. Accordingly, a voltage calculated as Vob−Vd is held in the capacitor 2. Therefore, the output Voutn from the amplifier circuit is expressed as:

$$Voutn=Gain*(Vn-Vpeak)+Vd(n=1, 2, \ldots ).$$

The image output Vn obtained from a low-contrast object is small in, amplitude as shown in FIG. 9A, and average values of the Vn are distributed around the accumulation end voltage level. Accordingly, a difference between each of the average values of the Vn and Vob is large while a difference between each of the average values of the Vn and Vpeak is small. In order to increase the amplitude of Vn, a large gain must be applied. However, in the dark reference output, the value of Vn−Vop with no gain applied is already so large that the gain cannot be increased as much as is sufficient. A signal output applied with a large gain exceeds the upper limit of output of the amplifier circuit to thereby saturate the output of the AF signal amplifying circuit.

On the other hand, in the peak reference output, a difference between the Vn and the Vpeak with no gain applied is small enough, which allows to set sufficiently a large gain. Application of a large gain greatly increases the amplitude of Vn, which leads to an improved AF capturing rate to be obtained through arithmetic operation processing which is performed after ADC conversion.

In this embodiment, combined use of the dark reference output and the peak reference output attains an improved AF capturing rate for a low-contrast object, as compared with the low AF capturing rate obtained for low-contrast object by the conventional dark reference output. It is also possible to use only one of the dark reference output and the peak reference output to simplify the arithmetic operation.

In the first embodiment, the operational amplifier and the variable resistors are used to form the noninverting amplifier. However, the noninverting amplifier may be replaced with an inverting amplifier. In this case, Vd needs to be set close to a power source voltage, and Vp needs to be set close to a ground voltage (GND).

Figure 5:
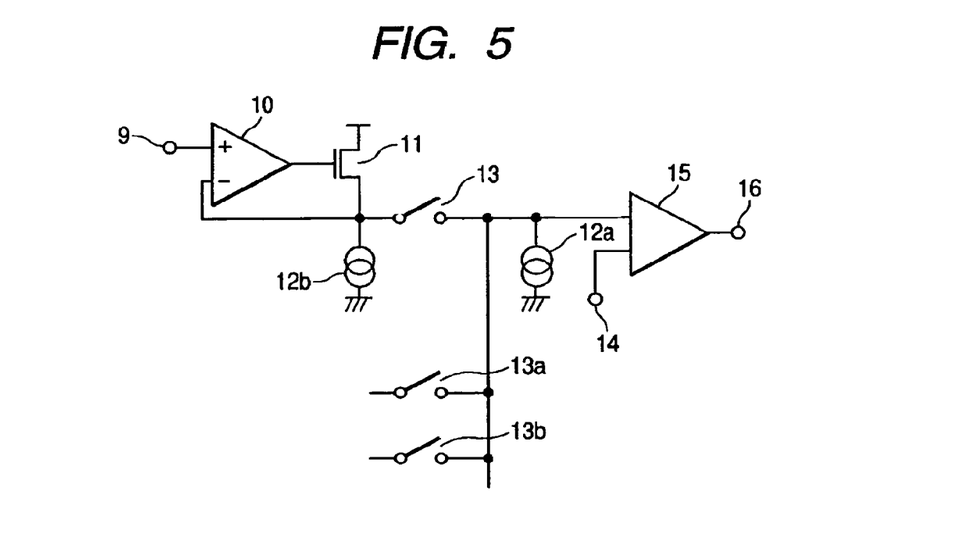
FIG. 5 is a circuit diagram showing a part of the solid state image pickup device for detecting focus according to the first embodiment of the present invention.

FIG. 5 shows the AGC circuit of FIG. 1.

In FIG. 5, the AGC circuit includes: an input terminal 9 at output voltage of a photodiode; an operational amplifier 10; an NMOS 11 connected to a source through a drain; a constant-current power supplies 12a and 12b; and a switch 13. The input terminal 9, the operational amplifier 10, the NMOS 11, the constant-current power supplies 12a and 12b, and the switch 13 are provided for each pixel of the photosensor array. The input terminal 9, the operational amplifier 10, the NMOS 11, the constant-current power supply 12 each connected to switches 13A and 13B, respectively, are not shown in FIG. 5. FIG. 5 also shows an input terminal 14 at an accumulation end level, a comparator 15, and a terminal 16 for outputting an accumulation end judgment result.

Pixel signal output and auto gain control (AGC) operation are described below. Output from the photodiode is inputted to the operational amplifier to drive a gate of the NMOS forming a source follower. Variations in threshold of the source follower can be corrected because the output from the source follower is fed back to the operational amplifier. The constant-current power supply 12b is turned on and the constant-current power supply 12b is turned off to input pixel signals to the AF signal amplifying circuit. The constant-current power supply 12b is turned off and the constant-current power supply 12a is turned on for the auto gain control (AGC) operation. In the auto gain control (AGC) operation, the constant-current power supply 12a serves as a common power source to drive the source of the NMOS through the switch, which makes it possible to obtain a maximum voltage of each pixel as an output from the source follower. Also, AGC can be performed on all the effective pixels or on the pixels in a center portion through on and off of the switch. When the maximum voltage outputted from each of the pixels is inputted to the comparator and reaches the accumulation end voltage level, the detection signal outputted from the comparator is highlighted.

Second Embodiment

Figure 6:
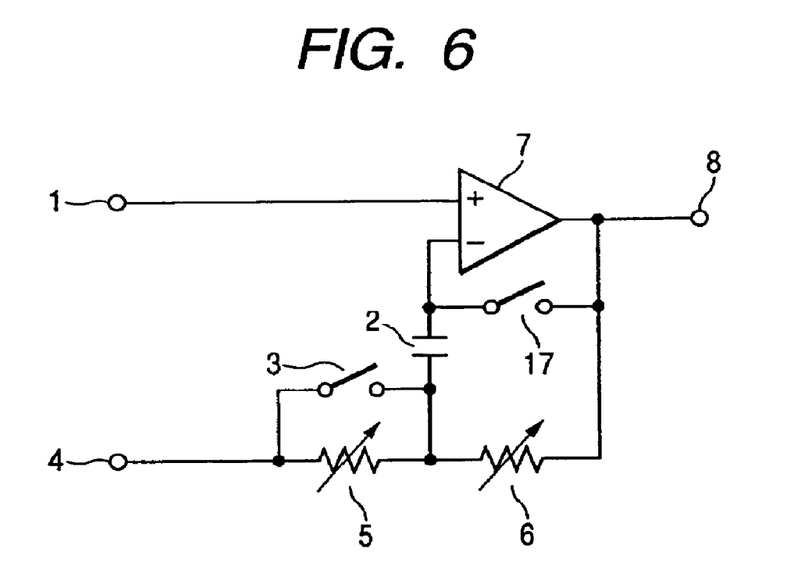
FIG. 6 is a circuit diagram showing a main part of a solid state image pickup device for detecting focus according to a second embodiment of the present invention.

FIG. 6 is a diagram showing an AF signal amplifying circuit according to a second embodiment of the present invention.

In FIG. 6, an explanation is omitted for the components similar to those of FIG. 2. FIG. 6 shows a switch 17 which operates at the same timing of the switch 3.

The AF signal amplifying circuit according to the second embodiment can follow the operation sequence same as that of the first embodiment. The AF signal amplifying circuit according to the second embodiment is different from that of the first embodiment in that the switch 17 is additionally provided to obtain a unity gain outputted from the operational amplifier. A difference between the unity gain outputted from the operational amplifier and the output reference voltage is recorded to thereby eliminate a DC offset held by the operational amplifier.

In the second embodiment, the operational amplifier and a variable resistor are used to form the noninverting amplifier. However, the noninverting amplifier may be replaced with an inverting amplifier. In this case, Vd needs to be set close to a power source voltage, and Vp needs to be set close to a ground voltage (GND).

Third Embodiment

Figure 7:
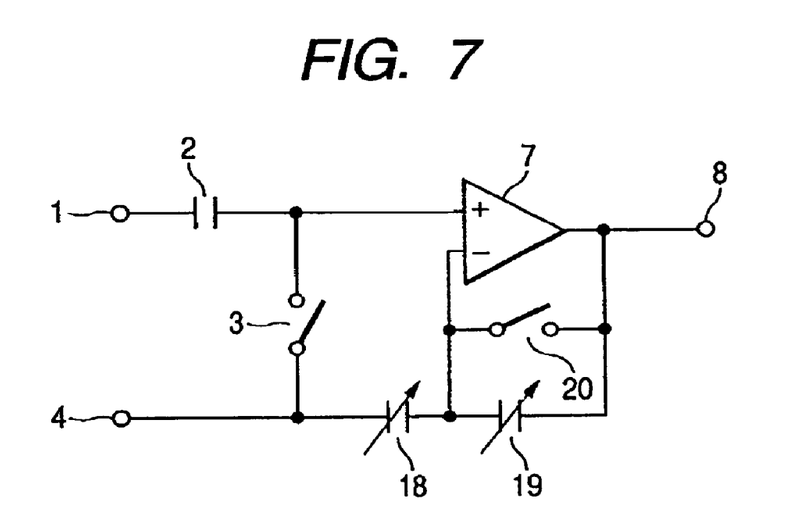
FIG. 7 is a circuit diagram showing a main part of a solid state image pickup device for detecting focus according to a third embodiment of the present invention.

FIG. 7 a diagram showing an AF signal amplifying circuit according to a third embodiment of the present invention.

In FIG. 7, an explanation is omitted for the components similar to those of FIG. 2. FIG. 7 shows variable capacitors 18 and 19 for determining an amount of gain, and a switch 20 which operates at the same timing of the switch 3. According to the first and second embodiments, a current flows between the output terminal of the operational amplifier and the input terminal 4. This current is driven by the operational amplifier and therefore relates to current consumption of the operational amplifier. Accordingly, resistance values of the variable resistors 5 and 6 of FIG. 2 must be raised in order to reduce the current consumption of the operational amplifier. However, a resistor element generally has a parasitic capacitance owing to a layout. Therefore, a greater resistance value increases an area for a layout, which increases the parasitic capacitance. As a result, a driving load for the operational amplifier is also increased to make it more difficult to design the operational amplifier. In the third embodiment, the variable capacitor are used to set the gain for the operational amplifier so as to prevent the current from flowing between the output terminal of the operational amplifier and the input terminal 4 to thereby reduce the current consumption.

The AF signal amplifying circuit according to the third embodiment can follow the operation sequence same as that of the first embodiment. The AF signal amplifying circuit according to the third embodiment is different from that of the first embodiment in that a switch 20 is additionally provided to reset a feedback capacitance. The switch 20 operates at the same timing of the switch 3.

In the third embodiment, the operational amplifier and a variable capacitor are used to form the noninverting amplifier. However, the noninverting amplifier may be replaced with an inverting amplifier. In this case, the Vd needs to be set close to a power source voltage, and the Vp needs to be set close to a ground voltage (GND).

The third embodiment and the second embodiment may be used in combination. That is, it is possible to employ such a circuit structure that the variable capacitors are used to set a gain while a difference between the unity gain outputted from the operational amplifier and the output reference voltage is recorded to thereby eliminate an offset held by the operational amplifier.

Fourth Embodiment

Figure 8:
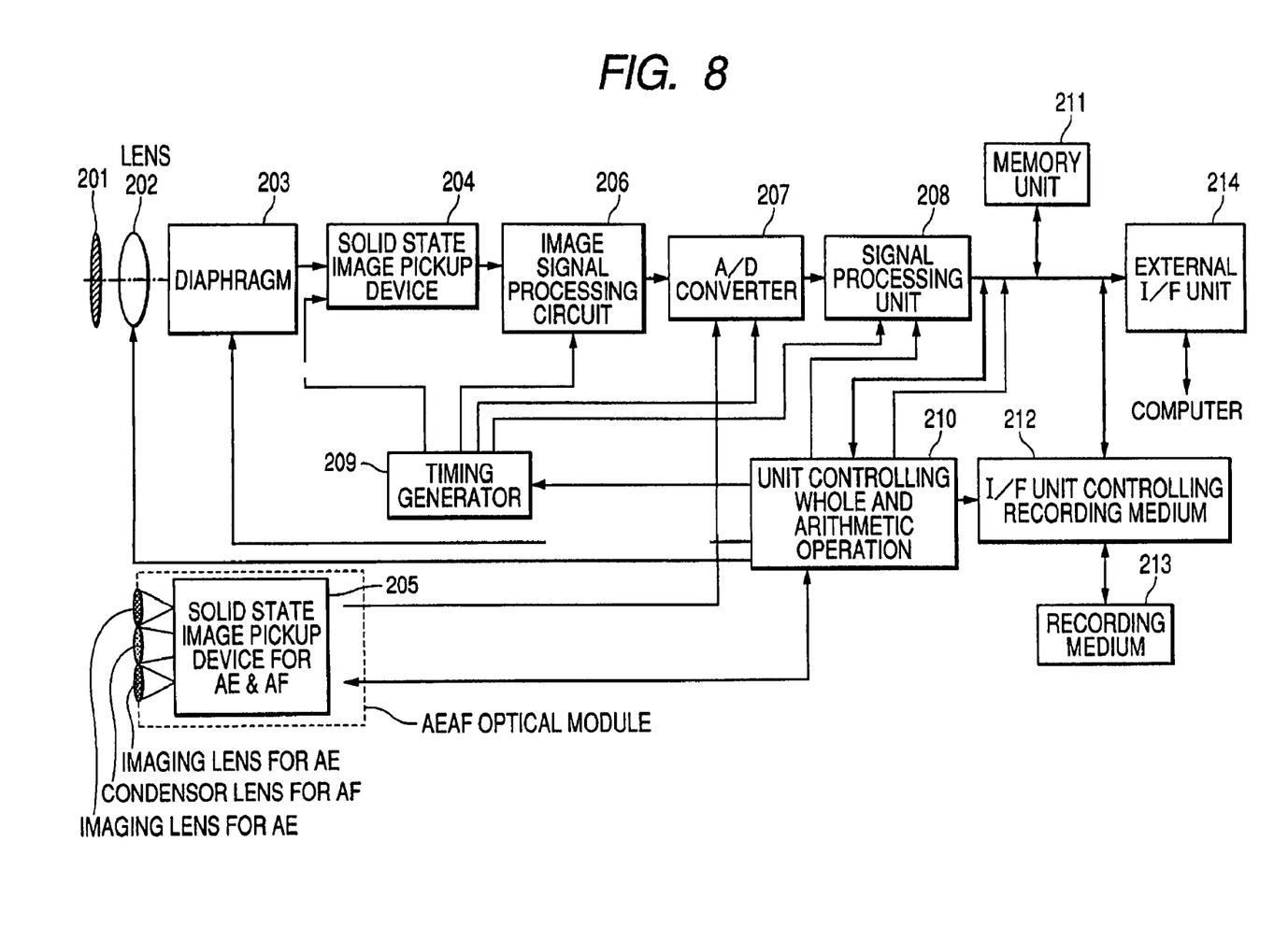
FIG. 8 is a system block diagram showing a fourth embodiment of the present invention.

Next, an explanation is given for an image pickup device using the solid state image pickup device for detecting focus according to the first to third embodiments. FIG. 8 is a block diagram showing an embodiment in which the solid state image pickup element is used for a lens shutter digital compact camera (image pickup device). FIG. 8 shows: a barrier 201 for serving as a lens protector and a main switch; a lens 202 for forming an optical image of an object on a solid state image pickup element 204; a diaphragm 203 for varying light quantity of light that has passed through the lens 202; and the solid state image pickup element 204 for capturing an image signal which corresponds to the object formed by the lens 202.

A solid state image pickup device 205 for AE&AF has a structure in which a photometric AE sensor circuit is added to the solid state image pickup device for detecting focus explained in the first embodiment. The image signal processing circuit 206 processes a signal sent from the solid state image pickup element 204, and an A/D converter 207 performs analog-digital conversion on an image signal, an AE signal, and an AF signal.

Further, signal processing unit 208 makes various corrections on image data outputted from the A/D converter 207 and performs data compression. A timing generator 209 issues various timing signals to the solid state image pickup element 204, the image signal processing circuit 206, the A/D converter 207, the signal processing unit 208, and the like. A unit controlling whole and arithmetic operation 210 performs various arithmetic operations and controls the whole of the camera, and a memory unit 211 temporarily stores image data.

An I/F unit controlling recording medium 212 records on and reads out from a recording medium, and a recording medium 213 is a removable recording medium such as a semiconductor memory for recording and reading image data. An external I/F unit 214 is used for communicating with an external computer and the like.

Next, an image capturing operation of the thus constructed lens shutter digital compact camera is explained. The barrier 201 is opened to turn on the main power source, subsequently a power source of a control system is turned on, and a power source of an imaging system circuit such as the A/D converter 207 is turned on.

The unit controlling whole and arithmetic operation 210 calculates a distance to an object with a triangle focus detection method based on a signal outputted from an AF circuit block of the solid state image pickup device 205. Then, a lens extension amount for extending the lens 202 is determined, and the lens is driven to a predetermined position for focusing.

Then, the signal outputted from the solid state image pickup device 205 is subjected to analog-digital conversion by the A/D converter 207 to be inputted to the signal processing unit 208. The unit controlling whole and arithmetic operation 210 calculates an exposure based on the signal as data thus obtained to thereby control the exposure. Based on the result of the metering obtained though the calculation of the exposure, the unit controlling whole and arithmetic operation 210 adjusts the diaphragm 203 and a shutter speed.

After that, under the proper condition for exposure, the solid state image pickup element 204 starts making a formal exposure. When the exposure is finished, an image signal outputted from the solid state image pickup element 204 is subjected to analog-digital conversion by the A/D converter 207, passes though the signal processing unit 208, and is written into the memory unit 211 by the unit controlling whole and arithmetic operation 210. Then, the signal stored as data in the memory unit 211 is controlled by the unit controlling whole and arithmetic operation 210 to pass through the I/F controlling recording medium 212 before being recorded on the removable recording medium 213. Alternatively, the data may pass through the external I/F unit 214 to be directly inputted to a computer or the like.

It should be noted that the solid state image pickup device for detecting focus according to the present invention is applied not only to a digital compact camera, but also to a silver-halide film camera, and further to a pint adjuster for a liquid crystal projector and the like.

This application claims priority from Japanese Patent Application No. 2005-123527 filed on Apr. 21, 2005, which is hereby incorporated by reference herein.

What is claimed is:

1. A solid state image pickup device, comprising:
    a pair of a plurality of photosensor arrays, each array including pixels;
    a control unit for determining an accumulation end of photocarrier accumulation of the plurality of photosensor arrays when a maximum value signal among signals outputted from each of the pixels of the plurality of photosensor arrays reaches an accumulation end voltage;
    a level shifter for level-shifting a signal outputted from each of the pixels of the plurality of photosensor arrays such that the maximum value signal is set to be an output reference voltage; and
    an amplifier for amplifying a plurality of signals, which have been level-shifted by the level shifter, and for outputting amplified signals,
    wherein the level shifter includes:
        an operational amplifier;
        a level shift capacitor electrically connected between a non-inverting input terminal of the operational amplifier and one of the pixels;
        a switch having a first terminal electrically connected to the non-inverting input terminal of the operational amplifier;
        a first circuit element electrically connected between an inverting input terminal of the operational amplifier and a second terminal of the switch;
        a second circuit element electrically connected between the inverting input terminal and an output terminal of the operational amplifier; and
        an input terminal electrically connected to the second terminal of the switch and supplied with the output reference voltage,
        wherein a gain of the amplifier is varied by the first and second circuit elements.

2. The solid state image pickup device according to claim 1, wherein the first and second circuit elements are variable resistors.

3. The solid state image pickup device according to claim 1, wherein the first and second circuit elements are variable capacitors.

* * * * *